(12) United States Patent
Juma et al.

(10) Patent No.: US 12,071,379 B2
(45) Date of Patent: Aug. 27, 2024

(54) CERAMIC OBJECTS AND METHODS FOR MANUFACTURING THE SAME

(71) Applicant: FOSECO INTERNATIONAL LIMITED, Derbyshire (GB)

(72) Inventors: Kassim Juma, Staffordshire (GB); Michael Leaney, Derbyshire (GB)

(73) Assignee: FOSECO INTERNATIONAL LIMITED, Derbyshire (GB)

( * ) Notice: Subject to any disclaimer, the term of this patent is extended or adjusted under 35 U.S.C. 154(b) by 731 days.

(21) Appl. No.: 16/317,319

(22) PCT Filed: Jul. 7, 2017

(86) PCT No.: PCT/GB2017/052011
§ 371 (c)(1),
(2) Date: Jan. 11, 2019

(87) PCT Pub. No.: WO2018/011549
PCT Pub. Date: Jan. 18, 2018

(65) Prior Publication Data
US 2019/0300442 A1    Oct. 3, 2019

(30) Foreign Application Priority Data
Jul. 14, 2016  (GB) ..................... 1612233

(51) Int. Cl.
*C04B 35/64* (2006.01)
*B29C 64/153* (2017.01)
(Continued)

(52) U.S. Cl.
CPC ............ *C04B 35/64* (2013.01); *B29C 64/153* (2017.08); *B33Y 70/10* (2020.01); *C04B 35/52* (2013.01);
(Continued)

(58) Field of Classification Search
CPC .............................. C04B 35/521; B33Y 10/00
See application file for complete search history.

(56) References Cited

U.S. PATENT DOCUMENTS 5,714,103 A    2/1998  Bauer et al.
6,372,289 B1 * 4/2002  Hickman ............... B01D 53/02
                                                    428/116
(Continued)

FOREIGN PATENT DOCUMENTS

CN    105102099    11/2015
CN    105269654    1/2016
(Continued)

OTHER PUBLICATIONS

International Preliminary Report on Patentability issued on Jan. 24, 2019 in PCT/GB2017/052011, 7 pages.
(Continued)

*Primary Examiner* — Farah Taufiq
(74) *Attorney, Agent, or Firm* — Nixon & Vanderhye PC

(57) ABSTRACT

Certain examples of the present invention relate to a method for manufacturing a ceramic object derived from a 3D printed ceramic structure. The method comprises: carbonising the 3D printed ceramic structure. Such carbonising of the 3D printed ceramic structure may comprise introducing a network of carbon bonding into the 3D printed ceramic structure via: impregnating and/or coating the 3D printed ceramic structure with a carbon precursor, or printing the 3D printed ceramic structure using a ceramic printing medium comprising a carbon precursor. The resultant 3D printed ceramic structure which comprises a carbon precursor is pyrolysed so as to form a network of carbon bonding within/surrounding the 3D printed ceramic structure.

15 Claims, 2 Drawing Sheets

(51) Int. Cl.
  *B33Y 10/00* (2015.01)
  *B33Y 70/10* (2020.01)
  *C04B 35/52* (2006.01)
  *C04B 38/00* (2006.01)
  *B33Y 80/00* (2015.01)

(52) U.S. Cl.
  CPC ........ *C04B 35/521* (2013.01); *C04B 38/0022* (2013.01); *B33Y 10/00* (2014.12); *B33Y 80/00* (2014.12); *C04B 2235/32* (2013.01); *C04B 2235/422* (2013.01); *C04B 2235/48* (2013.01)

(56) References Cited

U.S. PATENT DOCUMENTS

| | | | |
|---|---|---|---|
| 10,460,927 B2* | 10/2019 | Tak | H01L 29/4966 |
| 2004/0216860 A1 | 11/2004 | Pfeifer et al. | |
| 2005/0179152 A1* | 8/2005 | Bauer | F16D 65/125 |
| | | | 264/29.7 |
| 2005/0229746 A1* | 10/2005 | Juma | C04B 38/0022 |
| | | | 75/407 |
| 2006/0118990 A1 | 6/2006 | Dierkes et al. | |
| 2007/0090047 A1 | 4/2007 | Bell et al. | |
| 2011/0240245 A1 | 10/2011 | Schlienger et al. | |
| 2012/0264020 A1* | 10/2012 | Burton | H01M 4/587 |
| | | | 204/192.15 |
| 2013/0236784 A1* | 9/2013 | Lin | H01M 4/13 |
| | | | 429/212 |
| 2014/0242327 A1* | 8/2014 | Kim | C04B 35/5611 |
| | | | 156/169 |
| 2016/0052829 A1 | 2/2016 | Schoenfeld et al. | |
| 2016/0083300 A1* | 3/2016 | Ide | C04B 35/64 |
| | | | 428/448 |

FOREIGN PATENT DOCUMENTS

| | | |
|---|---|---|
| DE | 10 2013 017 193 | 4/2015 |
| EP | 2 998 282 | 3/2016 |
| GB | 1371082 | 10/1974 |
| JP | 7-23099 | 5/1995 |
| JP | 3656756 | 6/2005 |
| JP | 2006-306633 | 11/2006 |
| JP | 2010-188642 | 9/2010 |
| JP | 2010-234445 | 10/2010 |
| JP | 2013-516322 | 5/2013 |
| JP | 2016-44122 | 4/2016 |
| JP | 2016-521195 | 7/2016 |
| JP | 7148491 | 9/2022 |
| RU | 2 535 704 | 12/2014 |
| RU | 2 559 245 | 8/2015 |
| RU | 2 569 385 | 11/2015 |
| WO | WO 2014/150503 | 9/2014 |
| WO | 2015/168327 | 11/2015 |

OTHER PUBLICATIONS

International Search Report and Written Opinion of the ISA for PCT/GB2017/052011 dated Sep. 27, 2017, 11 pages.
Office Action issued on Nov. 12, 2020 in related Russian Application No. 2019104000/03 (with English-language machine translation), 13 pages.
Office Action issued in EP Appln. No. 17 739 676.9 dated Jun. 18, 2021 (6 pages).
Office Action issued in JP Appln. No. 2019-501500 dated Jun. 1, 2021, w/ English translation (14 pages).
Search Report issued on Nov. 10, 2020 in related Russian Application No. 2019104000/03, 3 pages.
Second Office Action issued on Sep. 30, 2021 in corresponding Chinese Application No. 201780043321.1 (with English translation), 12 pages.
Jul. 25, 2023 Office Action issued in Japanese Patent Application No. 2022-093303, pp. 1-4.

* cited by examiner

CERAMIC OBJECTS AND METHODS FOR MANUFACTURING THE SAME

This application is the U.S. national phase of International Application No. PCT/GB2017/052011 filed Jul. 7, 2017 which designated the U.S. and claims priority to GB 1612233.5 filed Jul. 14, 2016, the entire contents of each of which are hereby incorporated by reference.

TECHNOLOGICAL FIELD

Examples of the present disclosure relate to ceramic objects and methods for manufacturing ceramic objects. Some examples, though without prejudice to the foregoing, relate to a method for manufacturing a ceramic object derived from a 3D printed ceramic structure. Certain particular examples relate to a method of manufacturing a foundry filter for metal filtration comprising a ceramic filter and a ceramic foundry filter for metal filtration manufactured according to such a method.

BACKGROUND 3D printing, also known as Additive Manufacturing, is a well-known technique for manufacturing objects. 3D printing technologies encompass various differing techniques and processes, using differing printing materials, for synthesizing a three-dimensional object. Typically, in 3D printing, successive layers of a material are formed under computer control, for example based on a virtual 3D model or CAD design, which may enable the creation of an object of almost any shape or geometry. For Typically, in order to form a ceramic object via 3D printing, an initial ceramic structure/model is 3D printed by a 3D ceramic printer. The 3D printed ceramic structure then needs to be fired so as to sinter, e.g. fuse/vitrify/solidify the 3D printed ceramic structure thereby forming a resultant ceramic object. However, conventional 3D printed ceramic structures may require high firing temperatures (e.g. of the order of 1700° C.) to form the resultant ceramic object. Due to such high firing temperatures, the 3D printed ceramic structure shrinks during the firing process and may undergo asymmetric deformations or even crack. Accordingly, the resultant ceramic object, i.e. derived from the fired 3D printed structure, may have a poor net shape and low fidelity to the initial shape/dimensions of the pre-fired 3D printed structure.

Furthermore, such high firing temperatures may increase manufacturing costs due to the high grade equipment required (i.e. high temperature kilns) and also the energy consumption required. Furthermore, high firing temperatures may increase manufacturing production time due to the time required to reach the required high temperature as well as cooling time thereafter.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

According to at least some examples of the disclosure there is provided a method for manufacturing a ceramic object derived from a 3D printed ceramic structure, the method comprising: carbonising the 3D printed ceramic structure.

According to at least some examples of the disclosure there is provided a method for forming a 3D ceramic structure comprising: creating a 3D printed ceramic structure comprising a carbon pre-cursor.

The method may be for manufacturing a ceramic filter, such as a ceramic foundry filter for metal filtration, derived from a ceramic filter structure printed via a 3D ceramic printer.

According to at least some examples of the disclosure there is provided: an apparatus, a ceramic object and/or a ceramic foundry filter manufactured according to any of the above method.

According to at least some examples of the disclosure there are provided examples as claimed in the appended claims.

BRIEF DESCRIPTION OF THE DRAWINGS

For a better understanding of various examples of the present disclosure that are useful for understanding the detailed description and certain embodiments of the invention, reference will now be made by way of example only to the accompanying drawings in which.

Figure 1:
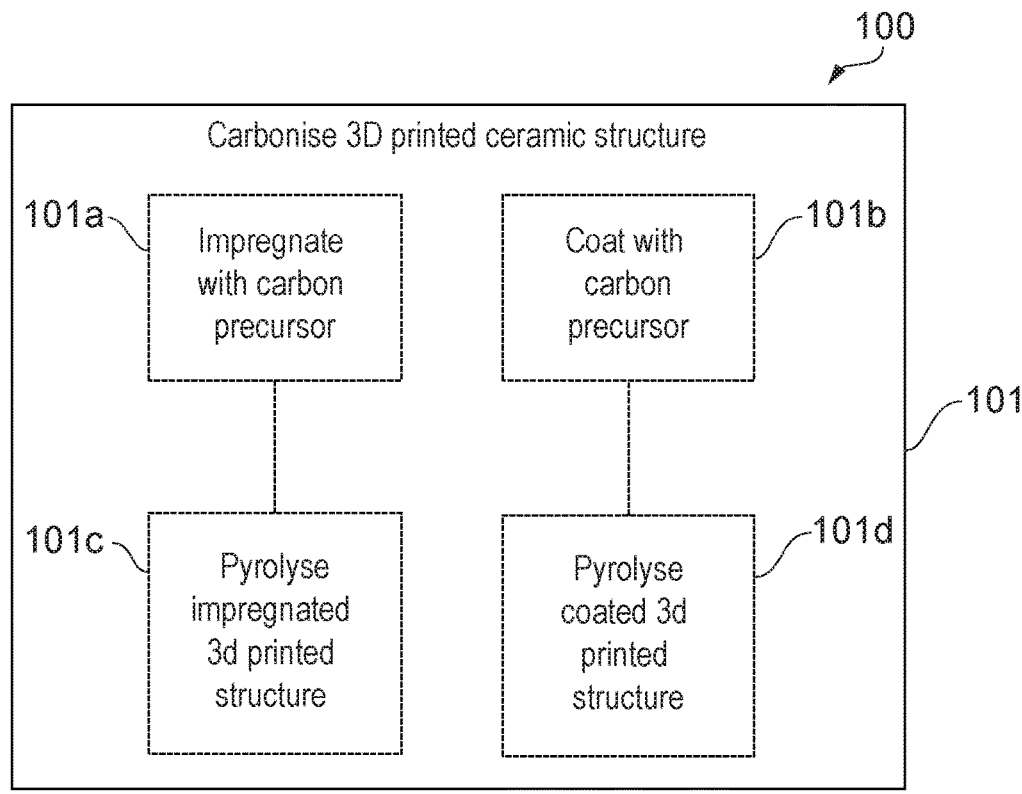
FIG. 1 schematically illustrates a method.

The Figures schematically illustrate a method 100 for manufacturing a ceramic object 205 derived from a 3D printed ceramic structure 202. The method comprising: carbonising 101 a 3D printed ceramic structure 202.

The term "carbonising", i.e. as in carbonising a 3D printed ceramic structure may be used to denote the introduction and formation of a network of carbon bonding into the 3D printed ceramic structure. Such a carbonising process may comprise impregnating or coating the 3D printed ceramic structure with a carbon precursor (i.e. an organic material/carbon containing compound) and pyrolysing the printed ceramic structure (i.e. firing the 3D printed ceramic structure in the absence of air/oxygen such that the organic material within/surrounding the 3D printed ceramic structure is carbonised thereby forming a network of carbon bonds within/surrounding the resultant ceramic object).

The act of carbonising the 3D printed ceramic structure relates to introducing and forming a network of carbon bonding into the 3D printed ceramic structure so as to provide carbon network bonding to the 3D printed ceramic structure which binds and secures the ceramic particles/material of the ceramic object. Such carbonising may be effected by impregnation and/or coating of the 3D printed ceramic structure with a carbon precursor material and then pyrolysing the impregnated/coated object thereby forming carbon network bonding internally/externally of the 3D printed ceramic structure. Alternatively, or in addition, such carbonising may be effected by pre-treatment/modification of the ceramic printing medium that the 3D printer uses to form/print the 3D ceramic structure, namely adding a carbon precursor to the ceramic printing medium. For example, a carbon precursor may be mixed in with the ceramic printing medium prior to printing such that a 3D printed structure is already imbedded with a carbon precursor material.

Some examples may provide the advantage in that lower firing temperatures are required. For instance, in certain particular examples, 3D printed structures could be pyrolysed at 900° C. but the resultant ceramic structure post pyrolysis might be able to withstand temperatures of 2700° C. The ability to use lower temperatures advantageously may reduce the amount of shrinkage the 3D printed ceramic structure undergoes thereby reducing the amount of deformation/cracking and give rise to an improved net shape with a higher fidelity of the resultant ceramic object as compared to the initial 3D printed ceramic structure. Furthermore, the reduced temperature requirements and resultant reduced amounts of shrinkage also reduces the risk of cracking of the resultant ceramic object. The reduced temperature requirement may also reduce the cost and timescales to manufacture ceramic objects as high temperature kilns may not be required and heating/cooling times may be reduced. Yet further, the carbonising of the 3D printed ceramic structure so as to introduce a network of carbon bonding therein may increase the structural strength and integrity as well as the rigidity of the resultant ceramic object. Certain examples may be particularly advantageous in the manufacture of ceramic filters, such as ceramic foundry filters for filtering molten metal wherein ceramic objects with high refractory qualities as well as high structural strength/integrity are required.

FIG. 1 schematically illustrates a method 100 for manufacturing a resultant ceramic object that is derived from an initial 3D printed ceramic structure/model.

The method may be for pre-treating and/or post-processing a 3D printed ceramic structure. For example, the method may be for treating an initial ceramic structure/model after it has been printed by a 3D ceramic printer and before the initial ceramic structure/model has been fired. Alternatively, or in addition, the method may be for pre-treating the ceramic printing medium prior before it has been printed by the 3D ceramic printer to form the 3D printed ceramic structure/model Any 3D printing/additive manufacturing process suitable for forming/synthesising a ceramic structure/precursor model may be used, not least for example: lithographic ceramic 3D printing or 3D printing based on: extrusion deposition, powder bed, ceramic jet printing or fusion deposition modelling.

Block 101 schematically represents the process of carbonising a 3D printed ceramic structure. Such a carbonising process relates to the introduction of a network of carbon bonding into the 3D printed ceramic structure. As schematically represented in block 101a and 101c, such a carbonising process may correspond to impregnating 101a the 3D printed ceramic structure with a carbon precursor and then pyrolysing 101c the impregnated 3D printed ceramic structure, i.e. firing the impregnated 3D printed ceramic structure in the absence of oxygen. It is to be appreciated that the 3D printed ceramic structure may be impregnated with a carbon precursor via any other appropriate impregnation technique, not least for example soaking, spraying or bathing the 3D printed structure with a carbon precursor such that the carbon precursor is soaked into the various pores, internal pathways and interior of the 3D printed structure.

Alternatively, or in addition, the impregnation could be achieved via a pre-treatment process namely by adding/mixing in a carbon precursor to a ceramic printing medium, such that the ceramic printing medium (the ceramic "ink" for the ceramic printer) comprises the carbon precursor such that the 3D printed ceramic structure formed/printed from such modified ceramic printing medium is already impregnated the carbon precursor. In such a manner, the carbonising process may comprise:

providing a ceramic printing medium to a 3D ceramic printer, wherein the ceramic printing medium comprises a carbon precursor;

forming the 3D printed structure by printing the 3D ceramic structure using the 3D ceramic printer and the ceramic printing medium comprising a carbon precursor; and pyrolysing the 3D printed ceramic structure.

Alternatively, or in addition to an impregnation process, the carbonising process may comprise coating 101b the 3D printed ceramic structure with a carbon precursor and then pyrolysing 101d the coated 3D printed ceramic structure, i.e. firing the coated 3D printed ceramic structure in the absence of oxygen. It is to be appreciated that the 3D printed ceramic structure may be coated with a carbon precursor via any other appropriate coating technique, not least for example: dipping, spraying, painting the 3D printed structure with a carbon precursor such that the carbon precursor is externally coated and provided with an outer boundary layer.

As used herein, a "precursor" may be used to refer to a substance from which another substance is formed, such as a carbon precursor via which, following carbonisation, a network of carbon bonding is formed. The carbon precursor may, for instance, comprise a liquid resin, powdered carbon, a ceramic binder, a ceramic material, an antioxidant, and a rheological additive. In certain examples, the carbon precursor comprises a phenolic liquid resin, in other examples the carbon precursor may comprise a carbon slurry.

The use of an antioxidant in the carbon precursor material may be particularly advantageous for uses of a resultant ceramic object that are required to have refractory qualities, i.e. wherein the ceramic object is required to have high temperature resilience as well as a high degree of structural strength and integrity, such as may be required for ceramic foundry filters for filtering molten metal. The carbon in the network of carbon bonds in the resultant ceramic object (formed via the carbonisation of the 3D printed ceramic structure) may oxidise in temperatures in excess of 600° C. in the present air. Thus, the use of antioxidants in the carbon precursor material can reduce such oxidisation and enable use of the resultant ceramic object temperatures in excess of 600° C. in the present air. Carbonisation of the 3D printed ceramic structure is also advantageous in applications such as metal foundry filtration since carbon is non-wetting upon application of liquid/molten metals.

The method of FIG. 1 represents one possible scenario among others. Not all the blocks are essential. For example, one or the other of: a) impregnating 101a and pyrolysing 101c, or b) coating 101b and pyrolysing 101d may be performed.

Furthermore, the blocks 101a-101d may be performed out of order. For example, the 3D printed ceramic structure may be impregnated 101a, then pyrolysed 101c and then coated 101b followed by a further pyrolysing process 101d. Alternatively, the 3D printed ceramic structure could be impregnated 101a and then coated 101b following which a single pyrolysing process is carried out. Thus, it is to be appreciated that in certain examples, one or more of the blocks may be performed in a different order or overlapping in time, in series or in parallel. Likewise, as indicated, one or more of the blocks may be omitted or added or changed in some kind combination of ways.

Figure 2:
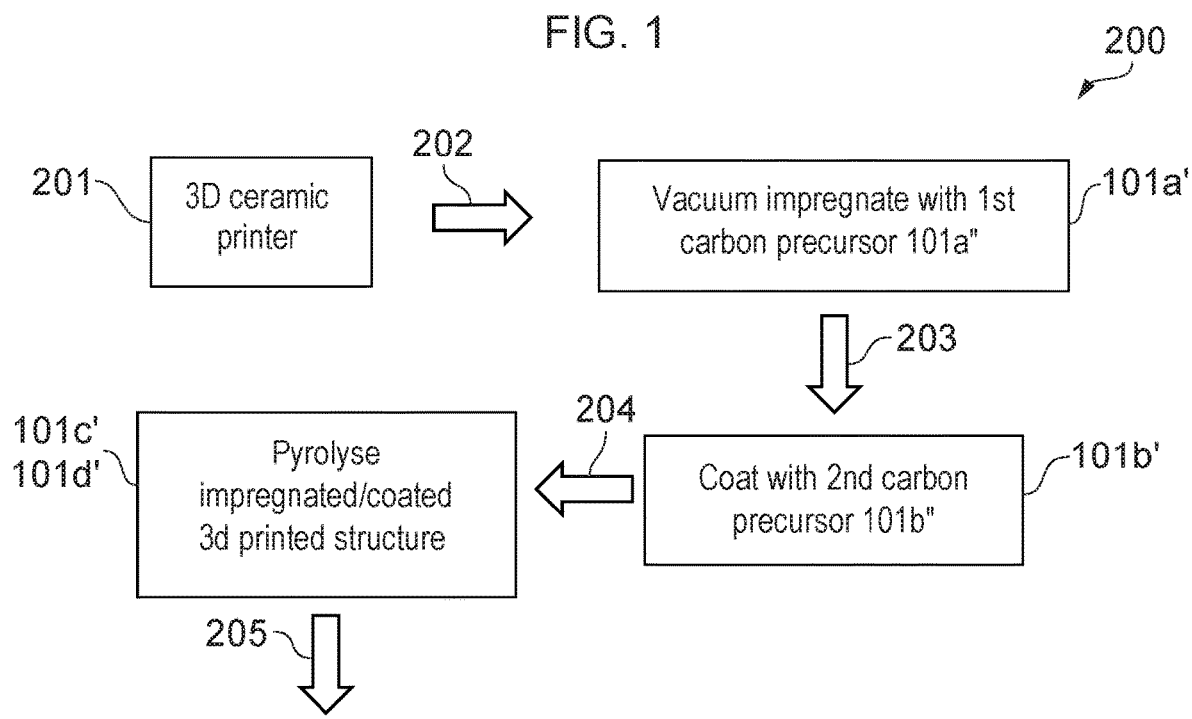
FIG. 2 schematically illustrates an overview of a process for manufacturing a ceramic object.

FIG. 2 schematically illustrates a block diagram of an overall process 200 involving the method of the present disclosure.

A 3D ceramic printer 201 prints an initial 3D ceramic structure/model which, in effect, forms a ceramic/precursor to a resultant ceramic object 205 once it has undergone the method of FIG. 1 and process of FIG. 2.

Instead of directly firing the 3D printed ceramic structure 202 (as may have typically been done for a conventional manufacturing a ceramic object from a 3D printed ceramic structure) prior to any firing of the 3D printed ceramic structure, it undergoes a carbonisation process 101, such as shown in FIG. 1. In the example of FIG. 2, the carbonisation process comprises an impregnation process 101a, in particular a vacuum impregnation process 101a' via which the 3D printed ceramic structure is impregnated with a first carbon precursor 101a".

The first carbon precursor may comprise one or more of: a liquid resin, powdered carbon, a ceramic binder, a ceramic material, an antioxidant, and a rheological additive.

The impregnated 3D printed ceramic structure 203 then undergoes a coating process 101b', in which the 3D printed ceramic structure 203 impregnated with a first carbon precursor is coated in a second carbon precursor 101b". The first and second carbon precursors 101a" 101b" may be different, i.e. having different compositions and configured to have differing characteristics. For example, the first carbon precursor 101a" may be configured so as to have a higher viscosity than the second carbon precursor 101b". This may facilitate its impregnation and soaking into the 3D printed ceramic structure in the impregnation process 101a'. The second carbon precursor 101b" may be configured so as to provide superior refractory properties, and/or to provide an external boundary layer coating of increased resilience, rigidity, structural strength and integrity. For example, the second carbon precursor may comprise carbon particles of a differing (e.g. larger) particle size to that of the first carbon precursor. The second carbon precursor may comprise a differing binder medium, differing ceramic material, differing antioxidant and/or differing rheological additive to that of the first carbon precursor. In some examples, the first carbon precursor may not comprise an antioxidant whereas the second carbon precursor for coating the entirety of the exterior of the 3D printed ceramic structure may comprise an antioxidant.

The impregnated and coated 3D printed ceramic structure 204 is then pyrolysed as indicated with reference to 101c' and 101d' so as to form a resultant ceramic object 205 in which the ceramic material of the 3d printed ceramic structure has been sintered/fused/vitrified and the carbon material of the precursors has formed a network of carbon bonds internally and externally of the resultant ceramic object.

Figure 3:
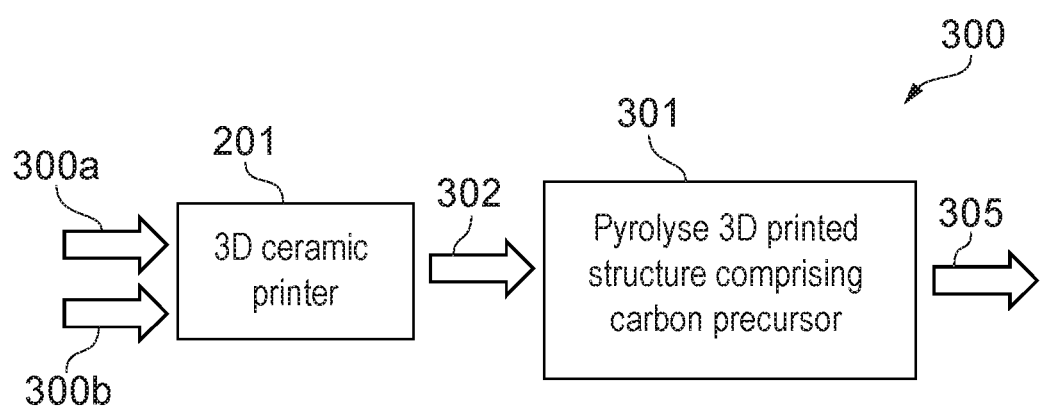
FIG. 3 schematically illustrates an overview of another process for manufacturing a ceramic object.

FIG. 3 schematically illustrates a block diagram of an overall process 300 involving an alternative method for forming a 3D ceramic structure 305, in which, instead of using conventional ceramic printing medium/material, the printing medium 300a is pre-treated by the addition/mixing of a carbon precursor 300b. For example, the binder of the ceramic printing medium could be a carbon containing compound that can act as a carbon precursor for the pyrolysing process.

The method involves creating a 3D printed ceramic structure 305 comprising a carbon pre-cursor 300a. Such a method may involve adding a carbon precursor 300a to a ceramic printing medium 300b and providing the same to a 3D ceramic printer 201. The 3D ceramic printer 201 then forms/prints a 3D printed ceramic structure 302 using the ceramic printing medium 300b comprising the carbon precursor 300a such that the 3D printed ceramic structure 302 comprises the carbon precursor. Since the 3D printed ceramic structure 302 already comprises the carbon precursor, the further impregnation or coating steps discussed above may not be required.

However, it is to be appreciated that such further impregnation 101c and coating 1014d process could be carried out to further imbue the 3D printed ceramic structure with carbon precursor and/or provide differing carbon precursors from each process.

The 3D printed ceramic structure 302 is then pyrolysed, as indicated with reference to block 301, so as to form a resultant ceramic object 305 in which the ceramic material of the 3D printed ceramic structure has been sintered/fused/vitrified and the carbon material of the precursor has formed a network of carbon bonds internally and externally of the resultant ceramic object.

The method and processes described above may be used for manufacturing a ceramic object such as a ceramic filter, for example a ceramic porous foundry filter for metal filtration, wherein an initial ceramic porous structure (similar to that of a ceramic foundry foam filter) is printed by a 3D ceramic printer that then undergoes the carbonisation process as discussed above.

In some examples, the 3D printed ceramic structure may be printed so as to be porous, for example so as to comprise an interconnected network of a plurality of pores and/or pathways suitably sized and dimensioned for enabling (for example after firing) the filtration of molten metal therethrough.

Examples of the present disclosure have been described using flowchart illustrations and schematic block diagrams. It will be understood that each block (of the flowchart illustrations and block diagrams), and combinations of blocks, can be implemented by any means, devices or machinery suitable for implementing the functions specified in the block or blocks. Accordingly, the blocks support: combinations of means, devices or machinery for performing the specified functions and combinations of actions for performing the specified functions.

Although features have been described with reference to certain examples, those features may also be present in other examples whether described or not. Although various examples of the present disclosure have been described in the preceding paragraphs, it should be appreciated that modifications to the examples given can be made without departing from the scope of the invention as set out in the claims. For example the order and sequence of the impregnating, coating and pyrolysing steps may be altered as discussed above.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some or all other examples. Thus 'example', 'for example' or 'may' refers to a particular instance in a class of examples. A property of the instance can be a property of

We claim:

1. A method of manufacturing a ceramic foundry filter for metal filtration, the method comprising:
   providing a 3D printed ceramic porous structure comprising a carbon precursor;
   impregnating the 3D printed ceramic porous structure with a first carbon precursor;
   coating the entirety of the exterior of the impregnated 3D printed ceramic porous structure with a second carbon precursor; and
   carbonizing and pyrolyzing the impregnated and coated 3D printed ceramic porous structure so as to introduce and form a network of carbon bonds internally and externally of the 3D printed ceramic porous structure in the manufacturing of the ceramic foundry filter for metal filtration, wherein the 3D printed ceramic porous structure is formed to have an interconnected network of a plurality of pores and/or pathways suitably sized and dimensioned for enabling, after the carbonizing and pyrolyzing, filtration of molten metal therethrough,
   wherein the first and second carbon precursors are different,
   wherein the first carbon precursor has a higher viscosity than the second precursor,
   wherein the second precursor comprises particles of a differing particle size to that of the first carbon precursor, and a different binder medium, ceramic material, antioxidant, and/or rheological additive,
   wherein only the second carbon precursor includes antioxidant, the antioxidant inhibiting oxidation of the carbon in the network of carbon bonds in the manufactured ceramic foundry filter,
   wherein the coating on the entirety of the exterior of the impregnated 3D printed ceramic porous structure inhibits oxidation of the network of carbon bonds beneath the coating, and
   wherein the first carbon precursor preferentially impregnates the 3D printed porous structure relative to the second precursor, and so that the second precursor provides an external boundary layer with refractory properties.

2. The method of claim 1, wherein providing the 3D printed ceramic porous structure comprises:
   providing a ceramic printing medium to a 3D ceramic printer, wherein the ceramic printing medium comprises a carbon precursor; and
   forming the 3D printed ceramic porous structure by printing the 3D ceramic structure using the 3D ceramic printer and the ceramic printing medium comprising a carbon precursor.

3. The method of claim 1, wherein impregnating the 3D printed ceramic porous structure with a carbon precursor comprises adding the carbon precursor to ceramic printing medium used to print the 3D printed ceramic porous structure.

4. The method of claim 1, further comprising 3D printing the 3D printed ceramic porous structure.

5. The method of claim 1, wherein the carbon precursor comprises at least one or more of:
   a liquid resin,
   powdered carbon,
   a ceramic binder,
   a ceramic material, and
   a rheological additive.

6. A ceramic foundry filter for metal filtration manufactured using the method of claim 1, wherein the filter comprises a 3D printed ceramic porous structure and a network of carbon bonds internally and externally of the ceramic porous structure.

7. The method of claim 1, wherein coating the 3D printed ceramic porous structure with a carbon precursor comprises dipping, spraying, and/or painting the 3D printed structure.

8. The method of claim 1, wherein coating the entirety of the exterior of the 3D printed ceramic porous structure with a second carbon precursor provides an outer boundary layer.

9. The method of claim 1, wherein the carbonizing and pyrolyzing of the impregnated and coated 3D printed ceramic porous structure is performed at a first temperature to introduce the network of carbon bonds and, post-pyrolyzing, the ceramic foundry filter for metal filtration is able to withstand exposure to a second temperature that is higher than the first temperature.

10. The method of claim 9, wherein the first temperature is less than 1700° C.

11. The method of claim 9, wherein the first temperature is less than 1000° C.

12. The method of claim 9, wherein the second temperature is at least three times higher than the first temperature.

13. The method of claim 1, wherein impregnating the 3D printed ceramic porous structure with a carbon precursor comprises vacuum impregnating the 3D printed ceramic porous structure with the carbon precursor.

14. The method of claim 1, wherein impregnating the 3D printed ceramic porous structure with a carbon precursor comprises spraying the 3D printed ceramic porous structure with the carbon precursor.

15. The method of claim 1, wherein impregnating the 3D printed ceramic porous structure with a carbon precursor comprises soaking the 3D printed ceramic porous structure with the carbon precursor.

* * * * *